United States Patent [19]

Floyd

[11] 4,026,599

[45] May 31, 1977

[54] MANUALLY OPERABLE DOOR RELEASE FOR VEHICLES

[75] Inventor: Henry G. Floyd, Plant City, Fla.

[73] Assignee: The Raymond Lee Organization, Inc., a part interest

[22] Filed: Dec. 29, 1975

[21] Appl. No.: 644,732

[52] U.S. Cl. .............................. 296/146; 292/221; 292/336.3

[51] Int. Cl.$^2$ .............................. B60J 5/04

[58] Field of Search ................ 296/146; 292/336.3, 292/171, 221, 225, DIG. 25

[56] References Cited

UNITED STATES PATENTS

| | | | |
|---|---|---|---|
| 1,896,311 | 2/1933 | Hinds | 296/146 |
| 2,339,170 | 1/1944 | Jacobs | 296/146 |
| 3,062,033 | 11/1962 | Schmalfeldt | 292/336.3 |
| 3,096,845 | 7/1963 | Oishei | 296/146 |
| 3,137,519 | 6/1964 | Wernig | 292/221 |
| 3,288,524 | 11/1966 | Gordon | 296/146 |
| 3,317,229 | 5/1967 | Scarpace | 292/336.3 |
| 3,374,021 | 3/1968 | Gulette | 292/336.3 |
| 3,427,060 | 2/1969 | Pennell | 292/336.3 |
| 3,652,124 | 3/1972 | Tronville | 296/146 |
| 3,858,922 | 1/1975 | Yamanaka | 292/336.3 |

*Primary Examiner*—Joseph F. Peters, Jr.
*Assistant Examiner*—John A. Carroll

[57] ABSTRACT

A vehicle has a door which can be locked by pushing downward on the enlarged top head of a vertical rod to cause the rod to move downward and which can be unlocked by raising the rod. A manually operable device for unlocking the door (once locked) from a remote location employs a vertical sleeve slidable along the rod. A ring is slidable along the rod and is disposed below the sleeve. A cable is secured at one end to the ring. A spring loaded mechanism coupled to the other end of the cable is secured to the vehicle to hold the cable taut. A control lever pivotally secured to the vehicle at the remote location is coupled to the mechanism and, when pivoted in a selected direction, causes the ring to move upward, pushing the sleeve upward against the head, to raise the rod.

4 Claims, 2 Drawing Figures

MANUALLY OPERABLE DOOR RELEASE FOR VEHICLES

SUMMARY OF THE INVENTION

This invention is directed towards a device which, when installed in a vehicle, allows the driver or another, at a location remote from a locked door, to manually unlock the door as a safety measure. This device is inexpensive and durable, is easily and manually operated, uses no electrical current and can be installed and removed quickly and easily.

The door is provided with a vertical rod, vertically moveable and provided an enlarged head. The door is locked by pushing downward on the head to move the rod downward and is conventionally unlocked by pulling the head upward to pull the rod upward.

In accordance with the invention, the device enables the door once locked to be unlocked remotely by manually pivoting a lever. To this end, a vertical sleeve is slidably disposed on the rod below the head. A ring is slidable along the rod and is disposed below the sleeve. A cable is secured at one end to the ring. Spring loaded means coupled to the other end of the cable is secured to the vehicle at a point remote from the door and holds the cable taut. The lever is pivotally secured to the vehicle at another remote point and is coupled to the means and the other end of the cable.

When the lever is properly pivoted, the ring rides upward along the rod, pushing the sleeve against the enlarged head of the rod to raise the rod and unlock the door.

DETAILED DESCRIPTION OF PREFERRED EMBODIMENT

Figure 1:
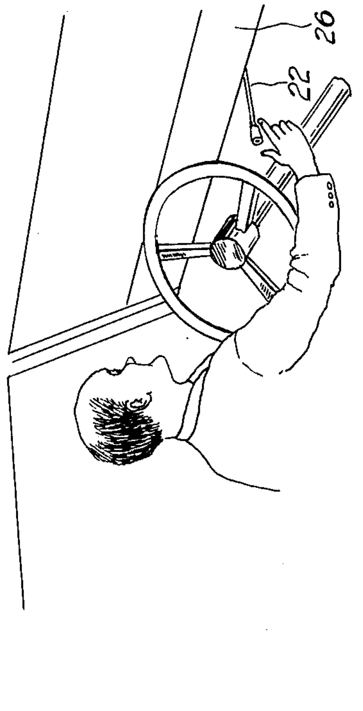
FIG. 1 shows the invention in use.
Figure 2:
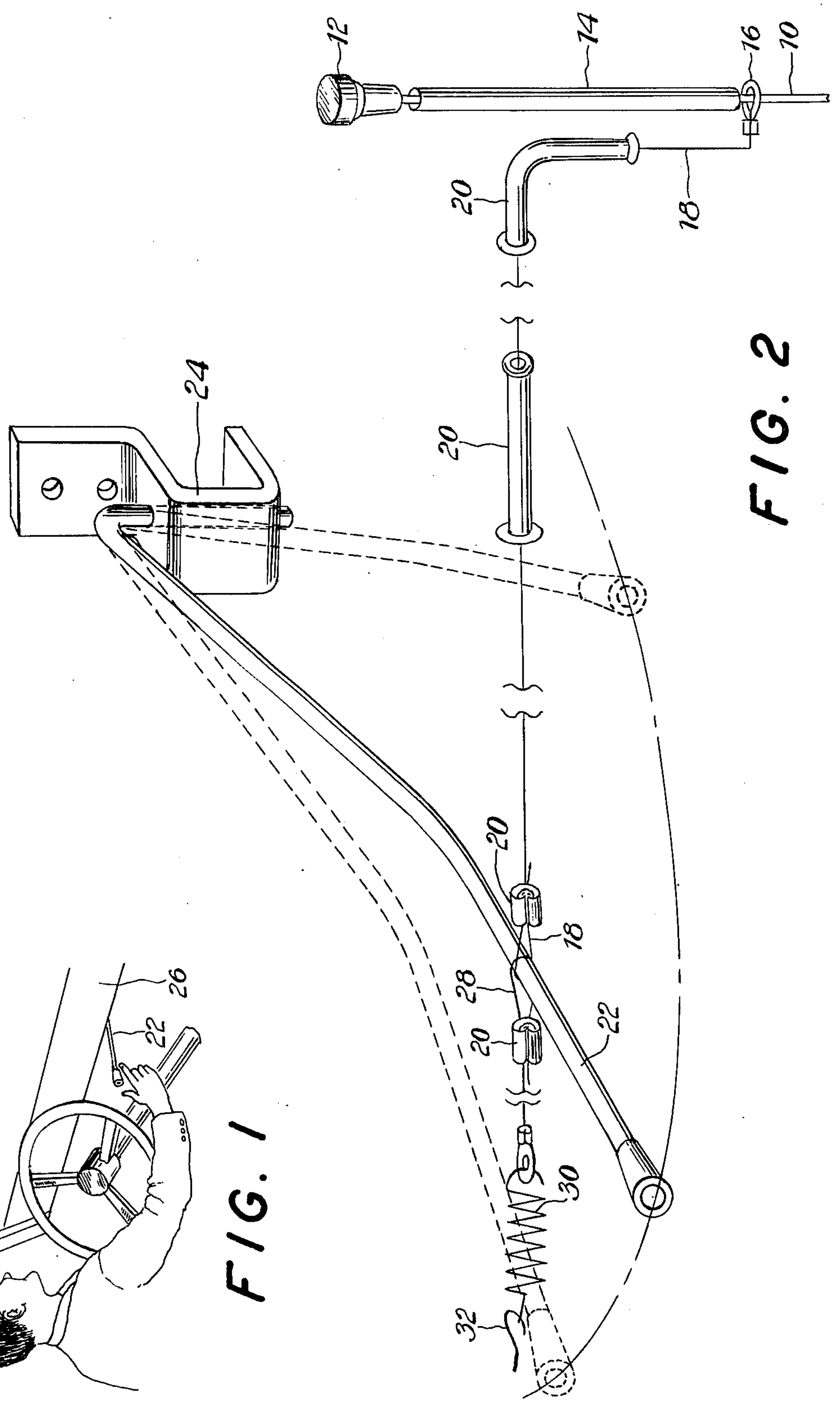
FIG. 2 is a view of the invention per se.

Referring now to FIGS. 1–2, vertically movable vertical rod 10, used to lock and unlock a door as described, has an enlarged top head 12. Vertical hollow sleeve 14 is slidable along the sleeve and, when moved up sufficiently high, can engage head 12 to move the rod upward to unlock the door is previously locked. A ring 16 slidably engages the rod and is disposed below the sleeve. The ring, if moved up sufficiently high, will bear against the sleeve and move it upward.

A cable 18, secured at one end to ring 16, passes through various types of bent hollow tubing 20 open at both ends, this tubing providing a protective shielding and guiding action without interfering with the action of the cable. The other end of the cable is looped around an arm of a control lever 22 pivotally disposed in bracket 24 secured to the instrument panel 26.

A second cable 28 is also looped at one end around the arm of control lever 22 and is secured at its other end to one end of coil spring 30. The other end of spring 30 is secured via hook 32 to the frame of the vehicle. The cable 18 is held taut. As the arm is manually pivoted to the left, cable 18 pulls the ring upward along the rod against the sleeve and then pulls the ring and sleeve upward until the sleeve engages head 12 and moves it upward to unlock the door.

While the invention has been described with particular reference to the drawings, the protection sought is to be limited only by the terms of the claims which follow.

What is claimed is:

1. In combination with a vehicle having a door which is locked by pushing a vertical rod downward and which is unlocked by raising the rod, a manually operable device for unlocking the door once locked, said rod having a top disposed enlarged head, said device comprising:

a sleeve vertically and slidably disposed along said rod;

a ring slidable along the rod and disposed below said sleeve;

a cable secured at one end to the ring;

spring loaded means coupled to the other end of the cable and connected to the vehicle at a point remote from the door to hold the cable taut;

a control lever pivotally secured to said vehicle at another point remote from the door, said lever being coupled to said means and the other end of the cable, said lever when pivoted in a selected direction, moving said means and cable to exert a lifting motion on said ring via said cable, said ring pushed upward against the sleeve to push the sleeve upward against said head to raise the rod and unlock said door.

2. The combination of claim 2 further including bent hollow tubing open at both ends and disposed to guide the cable without interfering with the motion thereof.

3. The combination of claim 2 wherein said other end of the cable is coupled to said lever, said means having another cable at one end also coupled to said lever, the other end of the means being connected to the vehicle.

4. The combination of claim 3 wherein said means includes a coil spring secured at one end to said another cable and at an opposite end to said vehicle.

* * * * *